Feb. 5, 1952     C. H. CRAWLEY     2,584,845
PIPE FITTING
Filed Jan. 14, 1950     2 SHEETS—SHEET 1
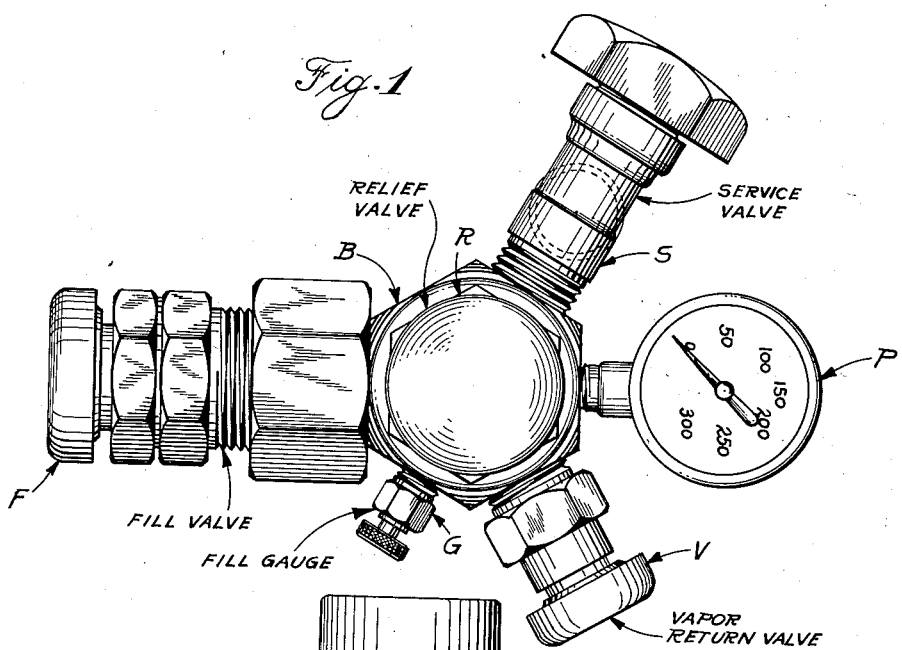
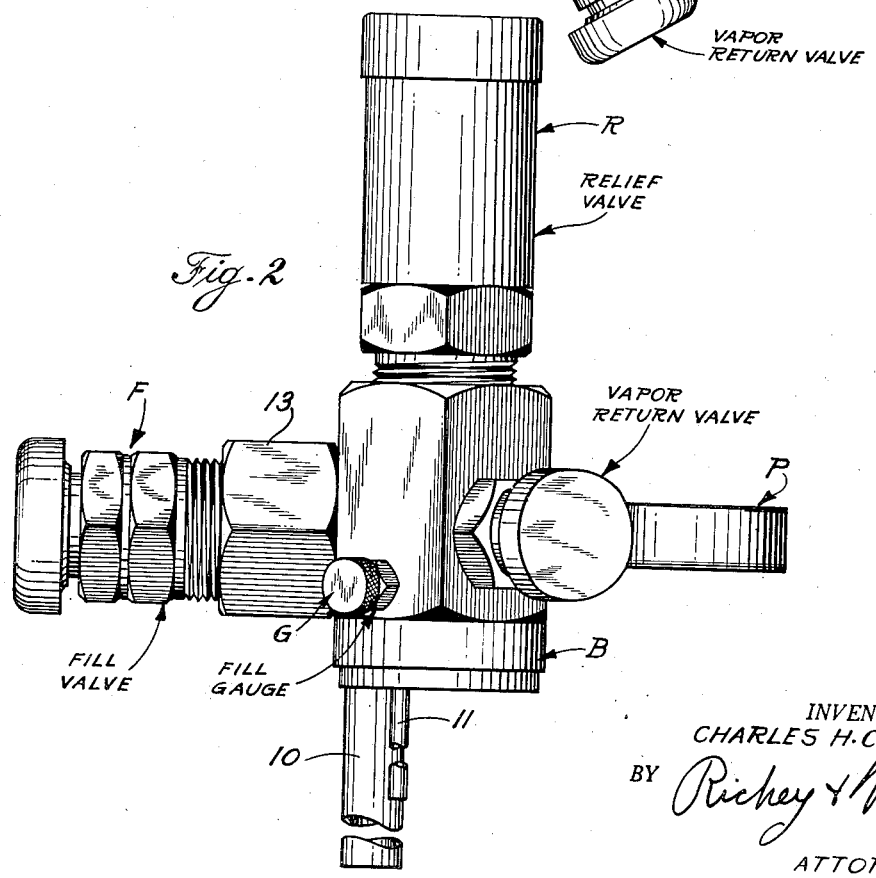
INVENTOR.
CHARLES H. CRAWLEY
BY Richey & Watts
ATTORNEYS Feb. 5, 1952 — C. H. CRAWLEY — 2,584,845
PIPE FITTING
Filed Jan. 14, 1950 — 2 SHEETS—SHEET 2
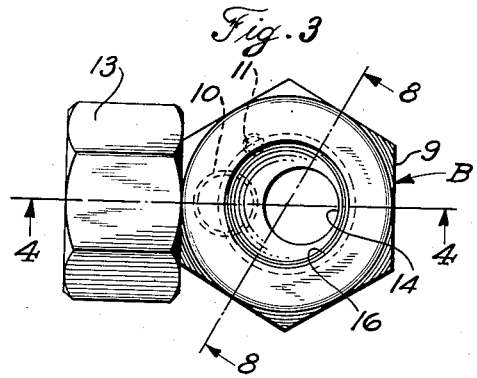
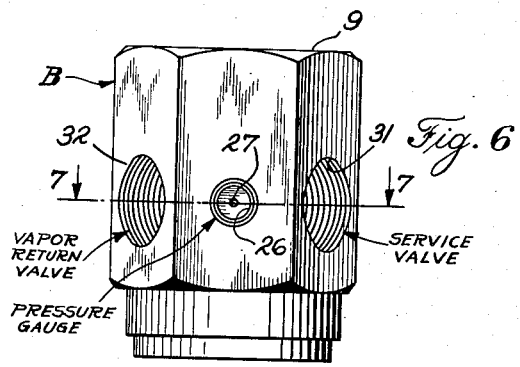
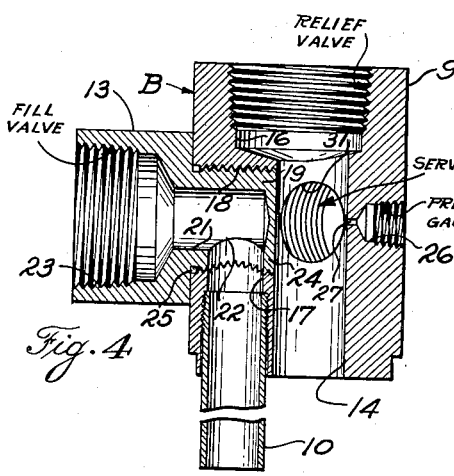
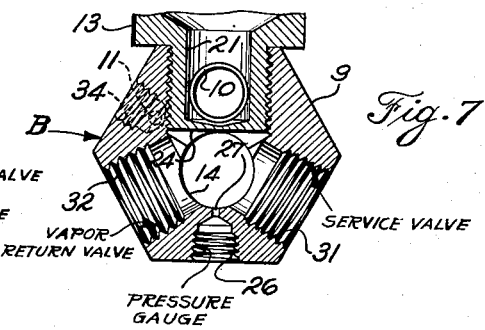
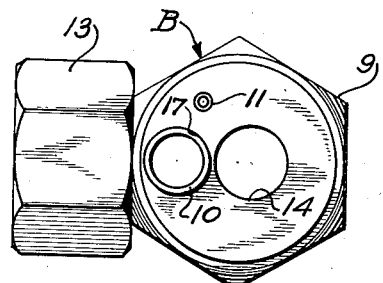
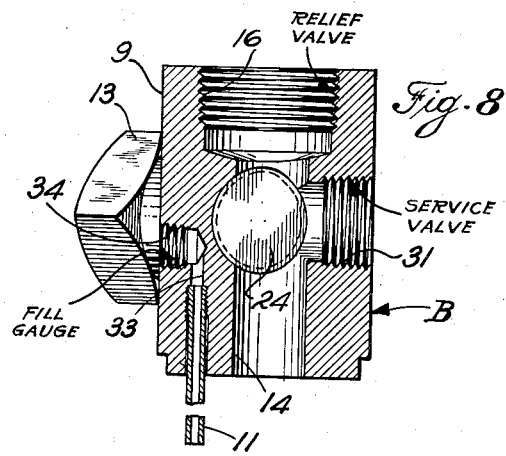
INVENTOR.
CHARLES H. CRAWLEY
BY Richey & Watts
ATTORNEYS Patented Feb. 5, 1952

2,584,845

UNITED STATES PATENT OFFICE 2,584,845

PIPE FITTING

Charles H. Crawley, Euclid, Ohio, assignor to The Weatherhead Company, Cleveland, Ohio, a corporation of Ohio Application January 14, 1950, Serial No. 138,565

2 Claims. (Cl. 285—210)

This invention relates to multiple valve heads for use in connection with the storing and dispensing of liquefied petroleum gases.

The principal object of the invention resides in the reduction of manufacturing costs of multiple valve heads without sacrifice to sturdiness and pressure withstanding ability of the device. Another object resides in making a valve head of maximum compactness.

Briefly, these objects are attained by making a two-part valve head body in such a manner that the entire body may be formed of bar stock and machined by simple drilling and tapping operations which facilitates the manufacture of the parts on automatic machinery such as screw machines and turret lathes.

The feature in the invention which makes it possible to substantially complete the valve body by drilling operations resides in the arrangement of a nipple that is permanently fastened to the main valve body and has a shank that fits in a radial bore intercepting two axial bores in the body and serving to wall off one of the bores and to connect with the other.

As will be seen as a detailed description of this invention proceeds, this arrangement makes it possible to fabricate a rather complex valve structure largely with drilling operations.

In the drawings:

Fig. 1 is a plan view of the assembled valve;
Fig. 2 is a side view thereof;
Fig. 3 is a top view of the valve body;
Fig. 4 is a section taken on 4—4 of Fig. 3;
Fig. 5 is a bottom view of the valve body;
Fig. 6 is a side view thereof;
Fig. 7 is a section taken on 7—7 of Fig. 6; and,
Fig. 8 is a section taken on 8—8 of Fig. 4.

Referring to the drawings, in Figs. 1 and 2 the valve body is shown assembled with the various units which connect thereto. The internal construction of these units forms no part of the invention and they are therefore not shown in section. In a typical installation a valve body B is arranged to functionally mount a number of valves in devices having various functions. For example, a fill valve F is supplied for filling the container with liquefied gas under pressure. The internal construction of this valve is not critical to the invention, a suitable arrangement of parts being disclosed in the copending application of Joseph N. Paquin, Serial No. 21,983, filed April 19, 1948. Likewise assembled with the body is a vapor return valve which is opened during the filling operation, a suitable structure being disclosed in the aforesaid pending application.

A service valve S is fitted to the body for controlling the dispensing of gas from the tank. A pressure gauge P may be applied to the valve body and a fill gauge in the form of a manually-operated petcock G is also fitted. The service valve and fill gauge may be formed as disclosed in the aforesaid pending application. In addition, a relief valve R is fitted to the valve body, the construction of which is not critical to the invention, a suitable arrangement being disclosed in the copending application of Joseph N. Paquin, Serial No. 17,090, filed March 25, 1948, now Patent No. 2,506,737.

The essence of the invention resides in the construction of the valve body B which is best shown in Figs. 4 to 8. Valve body B is a composite member with a main section 9 and, as seen in the drawings, a fill tube 10 and a gauge tube 11 may depend therefrom. An auxiliary or nipple section 13 is permanently attached to the main body section as will be presently described. The main body section 9 has a first axial bore 14 that may be formed by drilling and has aligned therewith an enlarged threaded bore 16, the latter being the means whereby the relief valve R is mounted. Bore 14 forms the gas chamber of the valve body. A second axial bore 17 is drilled in the valve, preferably to one side of and generally parallel to the bore 14, it being important that in the drilling operation bore 17 is terminated intermediate the axial extent of the body. A radial bore 18 is drilled to intersect both bores 18 and 17, and in the preferred construction bore 18 is tapped to provide threads for mounting the nipple section 13.

The nipple section 13 includes a shank 19 threaded for mounting in the bore 18. The shank is bored axially as at 21 and, after the nipple and main body have been assembled, radially as at 22, the last-named aperture coinciding with the bore 17 which forms the filling or liquid chamber of the valve body. The shank has an enlarged threaded bore 23 for reception of the fill valve F. The shank 19 has an imperforate end wall 24 which forms a closure for the bore 18 that intersects the axial bore 14. Thus, the end 24 of the shank (as best seen in Fig. 8) forms part of the wall of the gas chamber formed by bore 14.

The preferred means of joining permanently the nipple and main body section is by means of the furnace brazing process and to this end a ring of copper brazing wire 25 may be applied to the shank before it is threaded to the body. When the valve is heated in a furnace, preferably in a reducing atmosphere, the copper flashes about the threads and permanently bonds the parts.

As best seen in Fig. 7, in order to mount the service valve S a radial bore 31 is formed in the valve body to intersect the bore 14 and is threaded for interception of the valve. Similarly, the vapor return valve V is mounted in a second radial bore 32 intersecting the axial bore 14. The pressure gauge P is attached to the valve body by means of a threaded bore 26 which communicates with a port 27 leading to the axial bore 14.

In order to give a signal when the liquid in the tank reaches the proper level, a fill gauge device is employed. An axial bore 32 is formed in the body which terminates and intersects in a radial bore 34 that is threaded to receive the fill gauge petcock G. The tube 11 is mounted in bore 33 and extends to the desired liquid level, the operation of this arrangement being known to those skilled in the art.

Having completed a detailed description of the invention, it will be apparent that I am enabled to produce a multiple valve head for liquefied petroleum gas service which can be fabricated on automatic machinery by simple turning and drilling operations which is extremely small in over-all dimensions compared to prior designs and which has more than adequate strength and resistance to the disruptive forces of the pressures involved.

Having completed a detailed description of the invention so that others skilled in the art may practice the same, I contemplate that the appended claims and not the aforesaid embodiment be determinative of the scope of my invention.

What is claimed is:
1. A valve head for a multiple valve assembly comprising a body member having formed therein a first axial through bore for conducting gas, a second axial bore in said body to one side of said first axial bore and terminating intermediate the axial extent of said body, a generally radial bore in said body intersecting both of said bores, and a nipple member having a shank portion disposed and fastened in said radial bore, said nipple having a passageway communicating with said second bore, the end of said nipple shank being imperforate and forming part of the wall of said first bore to isolate said bores.

2. A valve head for a multiple valve assembly comprising a body member having formed therein a first axial through bore for conducting gas, a second axial bore in said body to one side of said first axial bore and terminating intermediate the axial extent of said body, a generally radial bore in said body intersecting both of said bores, and a nipple member having a shank portion disposed and fastened in said radial bore, said nipple having a passageway communicating with said second bore, the end of said nipple shank being imperforate and forming part of the wall of said first bore to isolate said bores, and a plurality of radial bores intersecting said first axial bore.

CHARLES H. CRAWLEY.

REFERENCES CITED

The following references are of record in the file of this patent:

UNITED STATES PATENTS

| Number | Name | Date |
| --- | --- | --- |
| 1,092,680 | Walters | Apr. 7, 1914 |